(Model.)
J. R. LOWREY.
BOILER FLUE.
No. 555,822.  Patented Mar. 3, 1896.
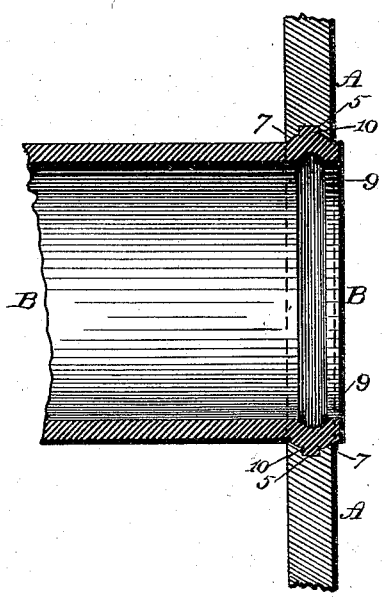
WITNESSES:
INVENTOR
Jno. R. Lowrey
BY Geo. W. Sues,
ATTORNEY.

UNITED STATES PATENT OFFICE.

JOHN R. LOWREY, OF OMAHA, NEBRASKA.

BOILER-FLUE.

SPECIFICATION forming part of Letters Patent No. 555,822, dated March 3, 1896.

Application filed January 21, 1895. Serial No. 535,729. (Model.)

*To all whom it may concern:*

Be it known that I, JOHN R. LOWREY, residing at Omaha, in the county of Douglas and State of Nebraska, have invented certain useful Improvements in Boiler-Flues; and I do hereby declare that the following is a full, clear, and exact description of the invention, such as will enable others skilled in the art to which it appertains to make and use the same, reference being had to the accompanying drawing, which forms a part of this specification.

This invention has relation to a new and novel improvement in boiler-flues, and comprises a simple method by means of which an exceedingly-tight joint between the flue and flue-plates can be obtained.

The accompanying drawing represents a vertical section of one end of a boiler-flue embodying my invention.

A represents the flue-plate which is provided with the usual large groove 7 and a smaller angular groove 5, which extends entirely around the large one 7 and forms a part thereof. The end of the tube B is first expanded into the large groove 7, and is then forced out into the groove 5, so as to fill it to any desired extent.

By forcing the metal of the tube into the angular groove 5, after making it conform to the larger groove, a joint just double the strength and stiffness of the usual joint is produced. The metal of the tube forced into this angular groove 5 is farther away from the effects of the fire than any other portion of the joint, and even should the joint formed by the tube and larger groove become weak or slightly sprung the metal in the smaller groove 5 will hold and continue to form a tight joint.

Having thus described my invention, I claim—

A flue-plate provided with a large groove, and a smaller angular groove extending around the larger one and forming part thereof, combined with a tube which has its end expanded into both of the grooves, substantially as shown.

In testimony whereof I affix my signature in presence of two witnesses.

JOHN R. LOWREY.

Witnesses:
W. W. WILDE,
A. S. RITCHIE.